US011551098B2

(12) United States Patent
Tan et al.

(10) Patent No.: US 11,551,098 B2
(45) Date of Patent: Jan. 10, 2023

(54) GENERATIVE ADVERSARIAL NETWORK-BASED OPTIMIZATION METHOD AND APPLICATION

(71) Applicant: Peking University, Beijing (CN)

(72) Inventors: Ying Tan, Beijing (CN); Bo Shi, Beijing (CN)

(73) Assignee: Peking University

( * ) Notice: Subject to any disclaimer, the term of this patent is extended or adjusted under 35 U.S.C. 154(b) by 420 days.

(21) Appl. No.: 16/823,856

(22) Filed: Mar. 19, 2020

(65) Prior Publication Data

US 2020/0311558 A1    Oct. 1, 2020

(30) Foreign Application Priority Data

Mar. 29, 2019   (CN) .......................... 201910250457.0

(51) Int. Cl.
*G06N 3/08*   (2006.01)
*G06N 3/04*   (2006.01)
(52) U.S. Cl.
CPC ........... *G06N 3/088* (2013.01); *G06N 3/0454* (2013.01)
(58) Field of Classification Search
CPC .............................. G06N 3/0454; G06N 3/088
See application file for complete search history.

(56) References Cited

U.S. PATENT DOCUMENTS 10,565,329 B2 *   2/2020   Greenwood .......... G16B 99/00
11,003,995 B2 *   5/2021   Rezagholizadeh .. G06N 3/0472

* cited by examiner

*Primary Examiner* — Tuan H Nguyen
(74) *Attorney, Agent, or Firm* — Lerner, David, Littenberg, Krumholz & Mentlik, LLP

(57) ABSTRACT

The present invention discloses a generative adversarial network-based optimization (GAN-O) method. The method includes: transforming an application into a function optimization problem; establishing a GAN-based function optimization model based on a test function and a test dimension of the function optimization problem, including constructing a generator G and a discriminator D based on the GAN; training the function optimization model by training the discriminator and the generator alternatively, to obtain a trained function optimization model; and using the trained function optimization model to perform iterative calculation to obtain an optimal solution. In this way, the optimal solution is obtained based on the GAN. The present invention can improve the parameter training process of a deep neural network to obtain a better local optimal solution in a shorter time, making the training of the deep neural network more stable and obtaining better local search results.

10 Claims, 4 Drawing Sheets

GENERATIVE ADVERSARIAL NETWORK-BASED OPTIMIZATION METHOD AND APPLICATION

CROSS REFERENCE TO RELATED APPLICATIONS

This application claims priority from Chinese application number 201910250457.0, filed Mar. 29, 2019, the disclosure of which is hereby incorporated herein by reference.

TECHNICAL FIELD

The present invention relates to the technical field of optimization computing, and in particular, to a generative adversarial network (GAN)-based optimization method and application.

BACKGROUND

Function optimization has always been one of the most important researches in mathematics and computer science. Function optimization can be applied in many scenarios, such as logistics allocation and deep network optimization, and can solve a large number of practical problems.

The existing algorithms for function optimization are gradient-based algorithms, with the disadvantage of being prone to local extrema. In a certain scenario such as neural network optimization, local extrema already achieve sufficiently good results, but a more accurate global optimal solution is needed in some scenarios. In this case, the algorithm needs to better balance "mining" and "exploration" to obtain a better global optimal solution. For this purpose, a large number of metaheuristic algorithms have been proposed. A metaheuristic algorithm is usually inspired by biological or human behavior, and by simulating such behavior, designs sophisticated mechanisms to guide algorithms to search for solution spaces, thereby avoiding local optimal solutions and finding global optimal solutions as much as possible.

Two critical parts of the metaheuristic algorithm are how to generate solutions and how to retain solutions. It is expected to generate better solutions with some diversity, so as to avoid local extrema in subsequent searches. It is also expected to retain better current solutions, as well as the solutions that are not so optimal currently but have potential in subsequent searches, because a solution better than the current optimal solution may be found around these solutions in subsequent searches. The earlier metaheuristic algorithms focus on optimizing the way to generate solutions, such as particle swarm optimization, ant colony optimization, genetic algorithm, and fireworks algorithm. In recent research, a large number of guiding vector-based methods have been proposed, such as GFWA and COFWA. Guiding vectors are introduced to limit the generation of solutions, thereby optimizing the quality of the generative solutions and obtaining better results.

In recent years, the generative adversarial network (GAN) as a new generation model has been proposed for image and text generation, and can even encapsulate malware. The GAN has demonstrated its powerful generation ability with its excellent performance. Unlike the previous generative models, the GAN instructs, by setting a loss function, a generative model to automatically learn how to generate. In the GAN, a discriminator and a generator can be alternately trained. The discriminator is used to discriminate whether an input sample is a generated sample or a real sample. The generator is used to generate a sample as real as possible to deceive the discriminator into determining that the sample is a real sample. The entire training process is like a game between the police and thieves, for which the generative adversarial network is named. Currently, a lot of progress has been made in the study of applying the generative adversarial network to image generation, video synthesis, text generation, and information security.

However, the existing function optimization algorithms lack diversity in local search. At present, the GAN has not been used for function optimization, and the existing generation methods are not effective.

SUMMARY

To overcome the foregoing shortcomings of the prior art, the present invention provides a generative adversarial network-based optimization (GAN-O) method and application, to search for global optimal solutions of continuous functions, and address the problem that the existing function optimization algorithms lack diversity in local search.

According to the present invention, an application problem (such as logistics distribution or deep network optimization) is transformed into a function optimization problem, and then a method generated based on a GAN is used for function optimization. First, a discriminator is trained to discriminate the advantages and disadvantages of two solutions. Then, a generator is trained to generate a guiding direction from known solutions. The guiding direction is multiplied by a step size, and the result obtained is added to the current solution to obtain a new solution. In the present invention, through the adversarial training between the discriminator and the generator, the discriminator can determine which of the two input solutions is better, and the generator obtains signal feedback from the discriminator, and gradually learns how to generate a better solution. Experiments show that a generation method learned by the generator after multiple iterations achieves better results than other existing generation methods such as Gaussian explosion and cross mutation.

The technical solutions of the present invention are as follows:

The present invention provides a generative adversarial network-based optimization (GAN-O) method and application. The method includes the following steps:

(1) Transform an application problem into a function optimization problem.

Logistics distribution, for example, aims to achieve a highest total logistics speed with the existing facilities. A discrete function optimization model can be established for the logistics distribution problem, to optimize the logistics speed or efficiency by using the existing facilities such as the limited distribution vehicles and limited warehouses. Machine learning and deep learning problems can be represented as minimizing a loss function in a finite continuous search space to implement training set fitting. Therefore, a function optimization model can be established for machine learning and deep learning problems, to optimize the loss function for the training set in the finite continuous search space.

(2) Establish a function optimization model based on a GAN, which includes the following steps:

(21) For a given test function and test dimension for function optimization, construct a generator (denoted as G) and a discriminator (denoted as D) based on the GNA. The inputs of the discriminator are two vectors whose sizes are the same as the test dimension, and the output is a scalar indicating whether the latter vector is better than the former vector (if so, the output is 1; otherwise, the output is 0). The input of the generator is a vector whose size is equal to the test dimension plus a noise dimension, and the output is a vector indicating a guiding direction, whose size is equal to the test dimension. A current solution is initialized randomly before iteration, and updated during each iteration.

(22) Train the function optimization model by training the discriminator and the generator, and update network parameters of the discriminator and the generator to obtain a trained function optimization model.

(3) Use the trained function optimization model for iterative calculation.

In each iteration of the model, first train the discriminator (that is, update the network parameter of the discriminator), and then train the generator (that is, update the network parameter of the generator). To update the network parameter of the discriminator or the generator, calculate a loss function, obtain a gradient for the network parameter based on the loss function, and then update the network parameter by using a gradient descent method.

Specifically, use the generator to generate training data in the manner described in (5), and then calculate the loss function of the discriminator and update the network parameter of the discriminator in the manner described in (6). Then, calculate a loss function of the generator in the manner described in (7), and update the network parameter of the generator based on the loss function. Use the generator to generate a new solution, combine it with the current solution to obtain all candidate solutions, calculate fitness values of all the candidate solutions, allocate retention probabilities based on the fitness values, and select, according to the retention probabilities, solutions with a same quantity as the current solutions from the candidate solutions as new current solutions.

In specific implementation, it is assumed that K current solutions are initialized randomly at the beginning. During each iteration, some solutions are generated by the generator and combined with the current solutions in the previous iteration as candidate solutions. Then, according to probabilities, K solutions are selected from the candidate solutions and retained as current solutions for next iteration. This ensures K current solutions during each iteration.

Iteration stops when the maximum number of iterations is reached. The solutions retained in this case are the optimal solutions and output by the algorithm.

The GAN-O method specifically includes the following steps:

(1) Transform an application problem into a function optimization problem, determine a function (referred to as a test function in the present invention) and a test dimension for the function optimization problem, and set a noise dimension. Specifically, perform the following operations:

(1a) Determine a to-be-optimized test function, including a function expression, a domain (denoted as D), and a function input dimension (denoted as $\|x\|$). After an independent variable x meeting requirements is input, the test function outputs a fitness value F(x) of the independent variable.

(1b) Set a test dimension $\|x\|$ (that is, a function input dimension) based on the actual situation. For an actual problem that is transformed in coding mode, set the test dimension to a coding dimension. For a data set function (such as the CEC2013 function set), set the test dimension to 30, 50, or 100.

(1c) Set a noise dimension (denoted as $\|z\|$). The noise dimension controls a size of a noise vector, and is connected to an input solution as an input when the generative network generates the solution. In the specific implementation of the present invention, the noise dimension is set to one-third of the test dimension.

Construct a GNA, including establishing a network structure and a loss function of the discriminator in step (2), and establishing a network structure and a loss function of the generator in step (3).

(2) Establish a network structure and a loss function of the discriminator.

(2a) The discriminator (denoted as D) receives two input solutions (denoted as $x_1$ and $x_2$), and outputs $D(x_1, x_2)$. An output value nearer to 1 indicates a better fitness value of $x_2$ than a fitness value of $x_1$ (that is, $F(x_2) \leq F(x_1)$); an output value farther from 1 indicates a better fitness value of $x_1$ than a fitness value of $x_2$.

(2b) For the two input solutions $x_1$ and $x_2$, use a same 4-layer fully connected network (denoted as $D_f$) to extract features. The dimension of an input layer of the fully connected network is the solution dimension (that is, the test dimension), the dimension of the second layer is 64, the dimension of the third layer is 64, and the dimension of the fourth layer is 10. An activation function of each layer is a rectified linear unit (ReLU). The fully connected network receives the two input solutions $x_1$ and $x_2$, and extracts two 10-dimensional vectors as their respective features.

(2c) Subtract the vector of the first solution from the vector of the second solution.

(2d) Send a vector obtained after the subtraction to a 3-layer fully connected network. The dimension of an input layer of the fully connected network (denoted as $D_c$) is 10, the dimension of the second layer is 10, and the dimension of the third layer is 1. An activation function of the second layer is an ReLU, and an activation function of an output layer is Sigmoid. After receiving a 10-dimensional vector obtained after the subtraction in (2c), the fully connected network finally outputs a scalar ranging from 0 to 1.

(2e) The output of the discriminator can be expressed as follows:

$$D(x_1, x_2) = D_c(D_f(x_2) - D_f(x_1));$$

(2f) Use a cross-entropy loss function as the loss function of the discriminator, and use Adam algorithm as an optimization algorithm.

(3) Establish a network structure and a loss function of the generator.

(3a) The generator (denoted as G) receives inputs, including a current solution (denoted as $x_{cur}$), noise (denoted as z), and a step size (denoted as L), and outputs a motion vector $G(x_{cur}, z, L)$. The motion vector is used to guide how the current solution moves to obtain a better fitness value. This vector will be added to the input current solution to generate a new solution.

(3b) Connect the input current solution $x_{cur}$ and noise z to obtain a new vector whose dimension is equal to the sum of the test dimension and the noise dimension.

(3c) Send the vector obtained in (3b) to a 3-layer fully connected network. The dimension of an input layer of the fully connected network (denoted as $G_d$) is the sum of the solution vector dimension and the noise vector dimension, the dimension of the second layer is 64, and the dimension of an output layer is the solution vector dimension. An activation function of the second layer is an ReLU, and an activation function of the output layer is a hyperbolic tangent function (Tan h). The fully connected network receives the vector obtained in (3b), and outputs a direction vector with the same dimension as a solution vector to guide subsequent motion directions.

(3d) Calculate the dot product of the direction vector obtained in (3c) and the input step size to obtain a motion vector as the final output of the entire generator, where the motion vector represents a specific motion direction and distance.

(3e) The output of the generator can be expressed as follows:

$$G(x_{cur}, z, L) = L \cdot G_d([x_{cur}^T, z^T]^T);$$

(3f) Use a cross-entropy loss function as the loss function of the generator, and use Adam algorithm as an optimization algorithm.

(4) Randomly initialize the current solution (denoted as a set $S_{cur}$) through global random search, and initialize the step size (denoted as L), where the step size can be input to the generator to generate a motion vector.

(4a) In global random search (denoted as GS), randomly sample solutions through standard Gaussian distribution, and then use the following formula to move the solutions to a solution space:

$$GS(x_{gs}) = B_l + (B_u - B_l) * x_{gs}, x_{gs} \sim P_{gaussian(0,1)} \quad \text{Formula 1}$$

where $x_{gs} \sim P_{gaussian(0,1)}$ represents that $x_{gs}$ is randomly sampled through standard Gaussian distribution; and $B_l$ and $B_u$ represent an upper limit and a lower limit of the domain D of the test function.

(4b) For current solutions $x_{cur}$ in the set $S_{cur}$, use the test function to calculate the corresponding fitness values $F(x_{cur})$, and sort them in ascending order of the fitness values to obtain an optimal current solution $x_{best}$ (the one corresponding to a largest fitness value) and its corresponding fitness value $F(x_{best})$.

(4c) Initialize the step size (denoted as L) to 50, set a currently optimal fitness value (denoted as $L_{best_F}$) recorded in a step controller to $F(x_{best})$, and set a counter (denoted as $L_{cnt}$) of the step controller to 0.

(5) Generate a data set (denoted as $T_D$) for training the discriminator. Specifically:

(5a) Use the generator (GE), local random search (LS), and global random search (GS) respectively to generate a new solution $x_{gen}$ based on the current solution $x_{cur}$ selected from a current solution set $S_{cur}$, and calculate a fitness value of $x_{gen}$. Compare the generated new solution $x_{gen}$ with the current solution $x_{cur}$ based on which the new solution is generated, and label it based on the fitness values (label it as 1 when the fitness value of $x_{gen}$ is greater than that of $x_{cur}$; otherwise, label it as 0) as the data for training the discriminator.

(5a1) Use the generator (denoted as G) to generate a solution (denoted as GE). Specifically, use the generator to generate a motion vector based on the current solution $x_{cur}$, and add the motion vector to the current solution to obtain the generative solution. Specific steps are as follows:

Step 1: perform random sampling through standard Gaussian distribution to obtain a noise vector.

Step 2: input a current solution, the noise vector obtained in step 1, and a step size into the generator, and run the generator to generate a motion vector.

Step 3: add the motion vector obtained in step 2 to the current solution to obtain the generative solution.

This can be expressed as formula 2:

$$GE(x_{cur}) = x_{cur} + G(x_{cur}, z, L), z \sim P_{gaussian(0,1)} \quad \text{Formula 2}$$

where z represents the noise vector; and L represents the step size.

(5a2) Obtain a generative solution (denoted as LS) through local random search. Specifically, perform random Gaussian sampling around the current solution $x_{cur}$ to obtain the generative solution. Specific steps are as follows:

Step 1: perform random sampling through standard Gaussian distribution to obtain a direction vector.

Step 2: multiply the direction vector obtained in step 1 by the step size to obtain a motion vector.

Step 3: add the motion vector obtained in step 2 to the current solution to obtain the generative solution.

This can be expressed as formula 3:

$$LS(x_{cur}) = x_{cur} + L * d, d \sim P_{gaussian(0,1)} \quad \text{Formula 3}$$

(5a3) Perform global random search as described in (4a).

(5b) Combine the solutions generated by using the three methods to obtain a new solution, and calculate its fitness value.

(5c) Combine the new solution obtained in (5b) and the current solution based on which the new solution is generated into a data pair, and compare their fitness values; and if a fitness value of the new solution is less than a fitness value of the current solution, label the data pair as 1, otherwise, label it as 0.

(5d) Generate a training data $T_D$, which can be expressed as follows:

$$T_D = \{(x_{cur}, x_{gen}, 1 \text{ if } F(x_{gen}) \le F(x_{cur}) \text{ else } 0)\} \quad \text{Formula 4}$$

where $x_{gen} \sim GS(x_{gs})$, $GE(x_{cur})$, $LS(x_{cur})$, $x_{cur} \in S_{cur}$.

(6) Use a training set $T_D$ to train the discriminator.

(6a) Sequentially take m pieces of training data $\{(x_{cur}^i, x_{gen}^i, y^i), i=1, 2, \ldots, m\}$ in batches from the training set $T_D$, and calculate a loss function according to formula 5:

$$loss_D = -\Sigma_{i=1}^m y^i * \log_2(D(x_{cur}^i, x_{gen}^i)) \quad \text{Formula 5}$$

where D represents the discriminator, and $D(x_{cur}^i, x_{gen}^i)$ represents an output of the discriminator when inputs are $x_{cur}^i$ and $x_{gen}^i$.

(6b) Calculate a gradient $g_D$ based on the loss function according to formula 6:

$$g_D = \frac{1}{m} \nabla_{\theta_D} loss_D \quad \text{Formula 6}$$

where $\theta_D$ represents a network parameter of the discriminator.

(6c) Update the network parameter of the discriminator by using Adam algorithm:

$$\theta_D = \theta_D - \mu \frac{\hat{s}}{\sqrt{\hat{r}} + \delta} \quad \text{Formula 7}$$

where $\mu$ is a learning step size, which is set to 0.001 in the present invention; $\delta$ is a small constant for numerical stability, which is set to $10^{-7}$; $\hat{s}$ represents correction of the first-moment deviation; and $\hat{r}$ represents correction of the second-moment deviation. The calculation formulas are as follows:

$$s = \rho_1 s + (1 - \rho_1) g_D,$$

$$r = \rho_2 r + (1 - \rho_2) g_D \odot g_D,$$

-continued $$\hat{s} = \frac{s}{1-\rho_1^t},$$

$$\hat{r} = \frac{r}{1-\rho_2^t},$$

where $\rho_1$ and $\rho_2$ are exponential attenuation rates of moment estimation, which are set to 0.9 and 0.999 in the present invention; t is the number of batches, which is initialized to 0 before training, and increases by 1 upon update of each batch; and s and t are variables of the first moment and the second moment, which are initialized to 0 before training, and updated according to the foregoing formula each time.

(7) Train the generator by performing the following operations:

(7a) Set the network parameter of the discriminator to un-trainable, and connect the discriminator to the generator, to form a network C, of which input is the input of the generator, and output is the output of the discriminator. The specific connection method is as follows:

Step 1: enter the current solution, noise, and step size into the generator and run the generator.

Step 2: add a motion vector generated by the generator to the current solution to obtain a generative solution.

Step 3: use the current solution and the generative solution obtained in step 2 as the inputs of the discriminator, and use the output of the discriminator as the output of the network C.

The output of C can be expressed as follows:

$$C(c_{cur},z,L)=D(x_{cur},x_{cur}+G(x_{cur},z,L)) \qquad \text{Formula 8}$$

(7b) Use current solutions batch-sampled from $S_{cur}$, random Gaussian noise, and a step size as the inputs of C, and run C to obtain the output $C(c_{cur}, z, L)$.

(7c) Calculate a loss function of the network C:

$$loss_C = -\Sigma_{i=1}^{m} 1*\log(C(x_{cur}^i,z,L)) \qquad \text{Formula 9}$$

where m is a quantity of samples each time.

(7d) Calculate a gradient $g_G$ based on the loss function (because the network parameter of the discriminator is set to un-trainable, the network parameter of C is the network parameter of the generator):

$$g_G = \frac{1}{m}\nabla_{\theta_G} loss_C \qquad \text{Formula 10}$$

where $\theta_G$ represents the network parameter of the generator.

(7e) Update the network parameter of the generator G:

$$\theta_G = \theta_G - \mu \frac{\hat{s}}{\sqrt{\hat{r}}+\delta} \qquad \text{Formula 11}$$

The settings and calculation methods of $\mu$, $\delta$, $\hat{s}$, and $\hat{r}$ are described in (6c).

(8) Select and retain current solutions by performing the following steps:

(8a) Combine a current solution set and a generative solution set to form a candidate solution set $S_{candidate}$.

(8b) For each solution in the candidate solution set, calculate its retention probability based on the order of its fitness value in all candidate solutions, as shown in formula 11:

$$P_{retain}(x) = \frac{r_{F(x)}^{-\alpha}}{\sum_{i=1}^{\|S_{candidate}\|} r_{F(x_i)}^{-\alpha}} \qquad \text{Formula 11}$$

where $P_{retain}(X)$ represents a retention probability of solution x; $r_{F(x)}$ represents the order of a fitness value of solution x in all candidate solutions arranged in ascending order; $\|S_{candidate}\|$ represents a size of the candidate solution set; and $\alpha$ is a parameter that controls the probability distribution, where a larger value of $\alpha$ indicates a higher retention probability of a solution with a small fitness value and a lower retention probability of a solution with a large fitness value, and $\alpha$ is set to 3 in the present invention.

(8c) Select a to-be-retained solution based on the retention probability of each solution, and update $S_{cur}$.

(9) Reduce a step size L by performing the following steps;

(9a) Check whether a difference between a fitness value of an optimal solution x* in the current $S_{cur}$ and $L_{best\_F}$ is less than a sufficiently small constant:

$$|F(x^*)-L_{best_F}|\le\varepsilon,$$

where $\varepsilon$ is a sufficiently small constant, which is set to 1e-8 in the present invention. If yes, perform (9b); if no, set $L_{cnt}$ to 0 and perform (9c).

(9b) Increase $L_{cnt}$ by 1, check whether $L_{cnt}$ is greater than a specified threshold T, and if so, multiply the step size L by an attenuation factor γ:

$$L=L^*\gamma, \text{ if } L_{cnt}>T,$$

where in the present invention, the threshold T is set to 50, and the attenuation coefficient γ is set to 0.6; and if not so, perform step (9c).

(9c) Update $L_{best\_F}$ to the fitness value F(x*) of the optimal solution x* in the current $S_{cur}$.

(10) Determine whether the number of current iterations reaches the maximum number of iterations, and if so, output the current optimal solution; otherwise, go back to step (5).

Compared with the prior art, the present invention has the following beneficial effects:

The present invention is the first to use a GNA for function optimization, and proposes a feasible GNA-based optimization algorithm. By training a generator and a discriminator alternately several times, the generator is able to generate a reasonable and effective motion vector for any current solution to guide the current solution to move to a better region in the solution space. Experiments show that the generator trained in the present invention has better local search capabilities than other existing local search algorithms. Therefore, the present invention can provide a better local search capability for various function optimization problems. Especially in the field of deep learning, as the network structure becomes deeper and more complex, the loss function becomes more nonlinear, leaving network parameters difficult to optimize and prone to local extrema. The method provided in the present invention can improve the parameter training process of a deep neural network to obtain a better local optimal solution in a shorter time, making the training of the deep neural network more stable.

DETAILED DESCRIPTION

The following further describes the present invention through embodiments with reference to the accompanying drawings, but the scope of the present invention is not limited by any means.

Figure 1:
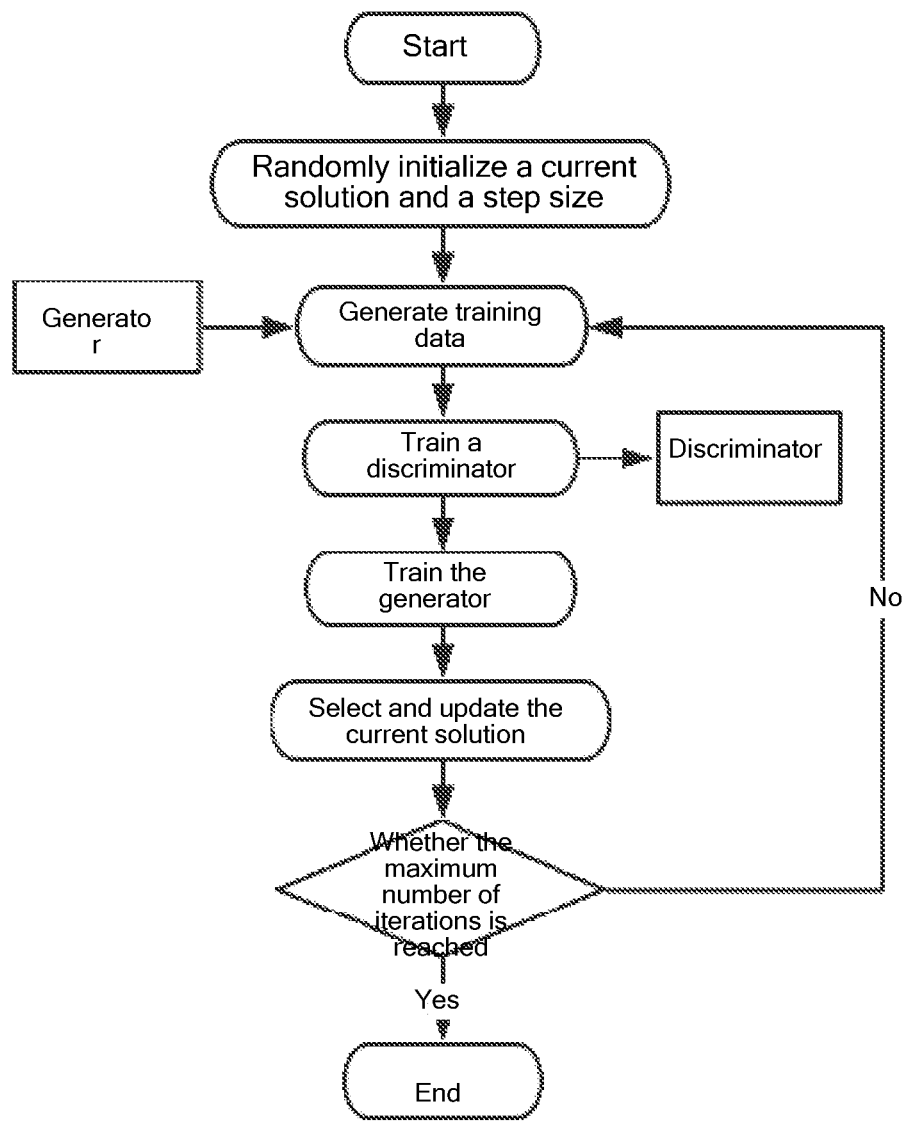
FIG. 1 is a flowchart according to the present invention.
Figure 2:
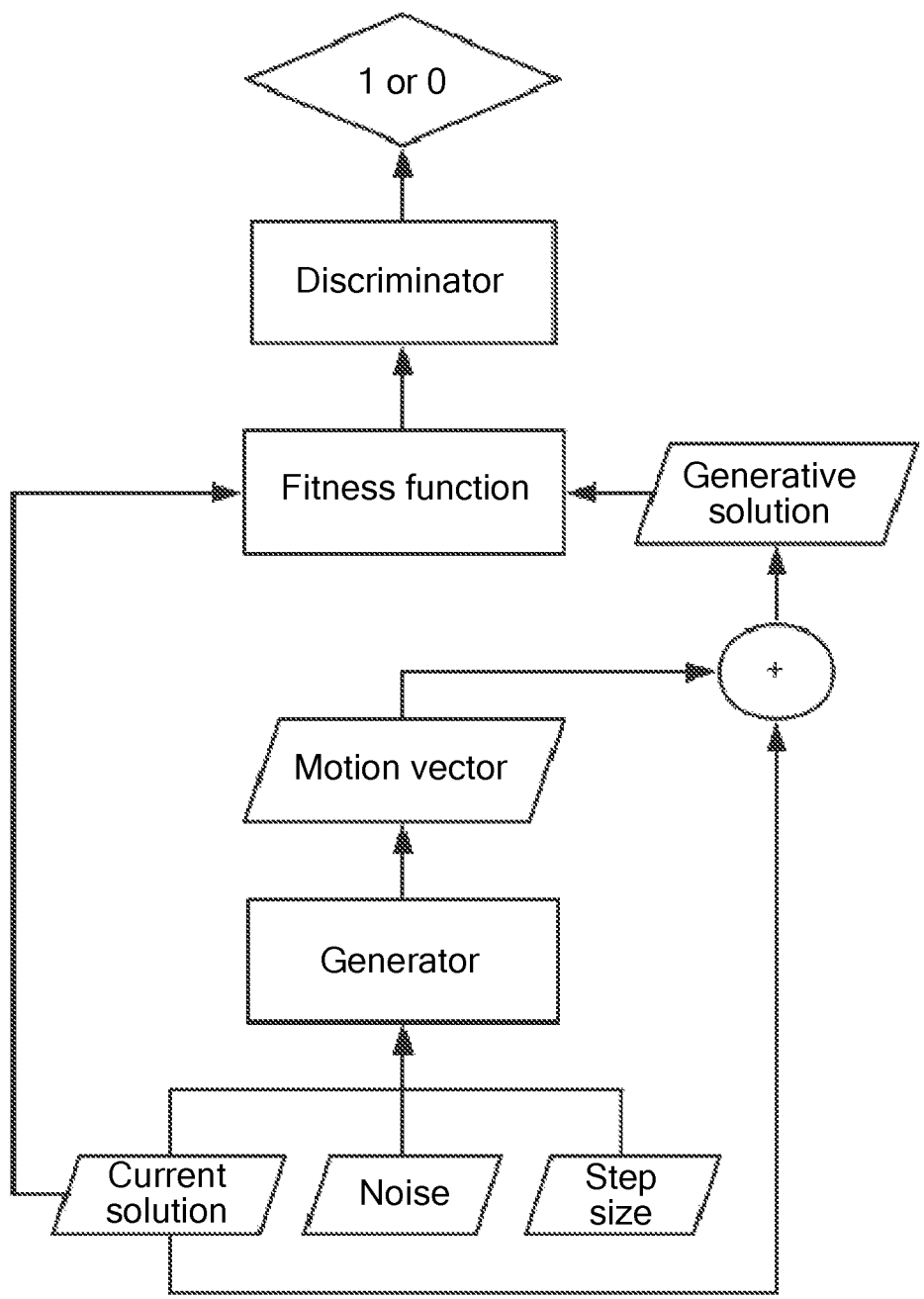
FIG. 2 is a schematic diagram of data flows in a generator and a discriminator in specific implementation of the present invention.

The present invention proposes a new algorithm framework for GNA-based function optimization, to address the lack of diversity of local search in function optimization. FIG. 1 shows a general process of a method in the present invention.

(1) For a given test function set, a generator network and a discriminator network are involved.

(2) Randomly initialize a current solution and a direction vector.

(3) Calculate a loss function of the discriminator network based on the current solution and the direction vector, and update parameters of the discriminator network.

(4) Determine the parameters of the discriminator network, connect the discriminator to the generator network, calculate a loss function of the generator network based on the current solution and randomly generated noise, and update parameters of the generator network.

(5) Determine whether the maximum number of estimations is reached, and if so, stop iteration and output a current solution; otherwise, go back to step (3). According to the present invention, a discriminator network and a generator network are trained alternately, where the discriminator network is used to determine whether one solution is superior to another solution, and the generator network is used to generate a guiding vector (GV) from a given solution, and add the GV to a current solution to obtain a new solution.

The following uses logistics distribution as an example to describe in detail the specific implementation of the method for GAN-based function optimization according to the present invention.

Step 1: Determine a test function and a test dimension to be input, and set a noise dimension.

(1a) Determine a to-be-optimized function, including a function expression, a domain D, and a function input dimension $\|x\|$. After an independent variable x meeting requirements is input, the test function outputs a fitness value F(x) of the independent variable. Generally, function optimization is to find an independent variable solution x* with a minimum fitness value to the function, that is:

$$F(x^*) \leq F(x), \forall x \in D(F);$$

(1b) Set a test dimension $\|x\|$ (the function input dimension) as required.

(1c) Set a noise dimension $\|z\|$. The noise dimension controls a size of a noise vector, and is connected to an input solution as an input when the generative network generates the solution. In the present invention, the noise dimension is set to one-third of the test dimension.

In specific implementation of the present invention, transforming the logistics distribution problem into a function optimization problem includes the following operations:

The logistics distribution problem is a discrete function optimization problem, aiming to minimize the delivery time. For example, there are a total of M delivery persons in one distribution station, the delivery speed of each delivery person is the same, and N locations are covered by the distribution station. Assuming that a distance from the delivery station to each locations is the same, a distance from the delivery station to the first delivery location can be ignored, and distances between every two distribution locations form matrix T, where T(i, j) represents the time for a delivery person to go from location i to location j. Logistics distribution is to arrange the delivery persons as reasonably as possible to minimize the total delivery time. The steps for transforming the logistics distribution problem into the function optimization problem are as follows:

1: Design a coding scheme for solutions to form a code $x_i \in \|N\|$, i=1, 2, ..., M of a solution.

(1a) Because each delivery person can only deliver goods in order, sort locations assigned to each delivery person in sequence to form a digital code string denoted as $x_i \in \|N\|$, i=1, 2, ..., M. $x_i$ represents a code of a location assigned to the i-th delivery person; and M is a total quantity of delivery persons. Since it is possible to assign all locations to one delivery person, the maximum dimension of $x_i$ is $\|N\|$. If a delivery person is assigned less than N delivery locations, add 0 for an unassigned location, indicating that no delivery is required.

(1b) Connect codes of M delivery persons to form a complete solution: $x=[x_1, x_2, \ldots, x_M]$.

2: Determine a solution space, namely the domain.

(1a) The dimension of the solution is equal to the sum of delivery codes of each delivery person, that is, $\|x\|=N*M$.

(1b) Because the problem is discrete, each dimension $x_i$ of x must range from 0 to N (0 indicates that no delivery is required; and a number ranging from 1 to N indicates delivery to a location represented by the number), and the number can only appear once in all dimensions of this solution. This can be expressed as follows:

$$x_i \in Z^+, 0 \leq x_i \leq N, \text{ for } i = 1, 2, \ldots, N*M,$$

$$\left(\sum_{i=i}^{N*M} (1 \text{ if } x_i == k \text{ else } 0)\right) = 1, \forall k \in Z^+, 1 \leq k \leq N.$$

where $Z^+$ represents a set of positive integers, N is a quantity of locations, and M is a quantity of delivery persons.

3: Determine an objective function.

(1a) Because M delivery persons deliver goods at the same time, the total delivery time is the time spent by a delivery person who completes the delivery last, that is:

$$T(x) = \max_{i=0}^{N-1} \left(\sum_{j=1}^{N-1} t(x_{i*N+j}, x_{i*N+j+1})\right)$$

where:

$$t(k, 1) = \begin{cases} T(k, l), & \text{if } k \geq 1 \text{ and } l \geq 1 \\ 0, & \text{else} \end{cases}$$

Then the objective function is:

$$T(x) = \max_{i=0}^{N-1}\left(\sum_{j=1}^{N-1} t(x_{i*N+j}, x_{i*N+j+1})\right),$$

where:

$$t(k, l) = \begin{cases} T(k, l), & \text{if } k \geq 1 \text{ and } l \geq 1 \\ 0, & \text{else} \end{cases};$$

the dimension of the solution is $\|x\|=N*M$; and the domain is:

$$x_i \in Z^+, 0 \leq x_i \leq N, \text{ for } i = 1, 2, \ldots, N*M,$$

$$\left(\sum_{i=1}^{N*M} (1 \text{ if } x_i == k \text{ else } 0)\right) = 1, \forall k \in Z^+, 1 \leq k \leq N.$$

Step 2: Establish a network structure of a discriminator.

Figure 3:
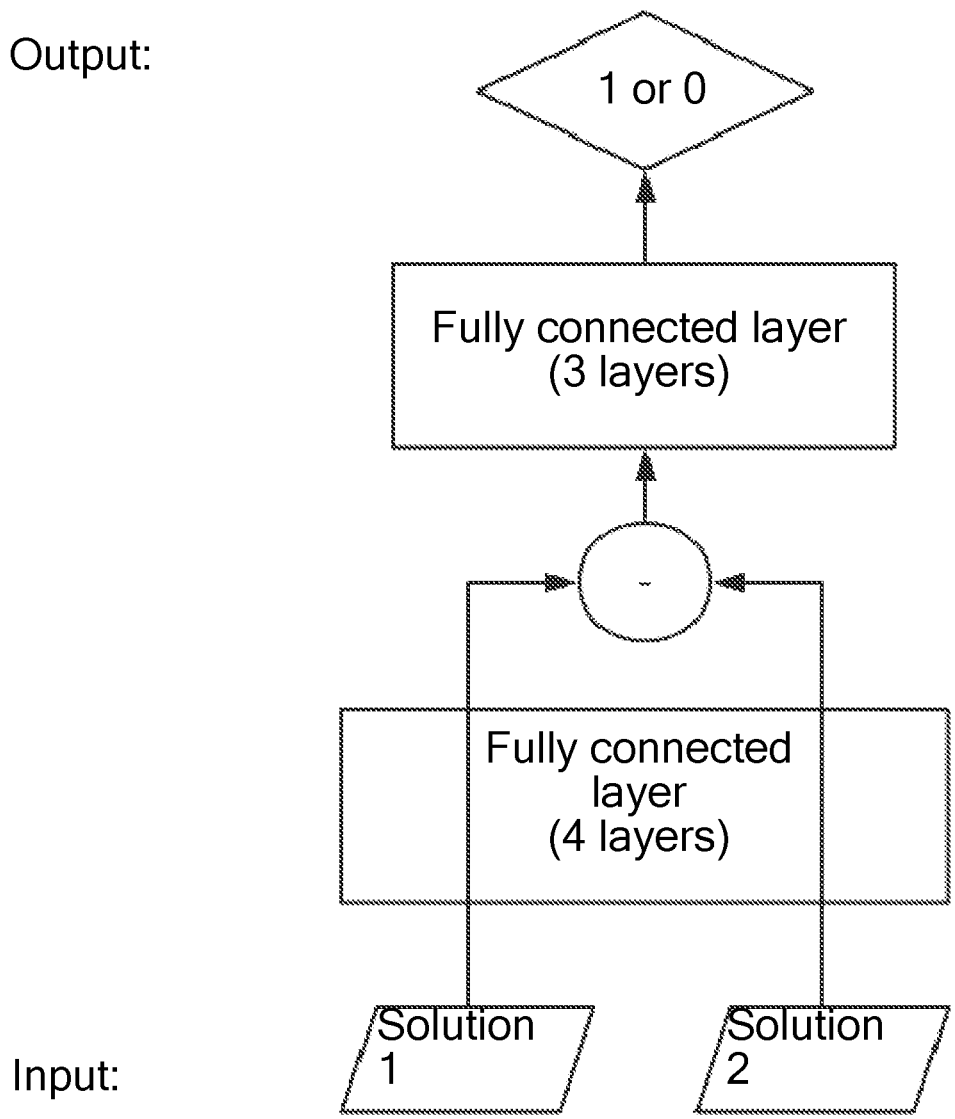
FIG. 3 is a structural diagram of a discriminator according to the present invention.

(2a) As shown in FIG. 3, the discriminator receives two input solutions $x_1$ and $x_2$, and outputs $D(x_1, x_2)$. An output nearer to 1 indicates a higher probability that a fitness value of $x_2$ is better than a fitness value of $x_1$, that is, $F(x_2) \leq F(x_1)$; an output farther from 1 indicates a higher probability that the first solution is better than the second solution.

(2b) For the two input solutions $x_1$ and $x_2$, use a same 4-layer fully connected network (denoted as $D_f$) to extract features. The dimension of an input layer of the fully connected network is the solution dimension (that is, the test dimension), the dimension of the second layer is 64, the dimension of the third layer is 64, and the dimension of the fourth layer is 10. An activation function of each layer is a rectified linear unit (ReLU). The fully connected network receives the two input solutions $x_1$ and $x_2$, and extracts two 10-dimensional vectors as their respective features.

(2c) Subtract the vector of the first solution from the vector of the second solution.

(2d) Send a vector obtained after the subtraction to a 3-layer fully connected network. The dimension of an input layer of the fully connected network (denoted as $D_c$) is 10, the dimension of the second layer is 10, and the dimension of the third layer is 1. An activation function of the second layer is an ReLU, and an activation function of an output layer is Sigmoid. After receiving a 10-dimensional vector obtained after the subtraction in (2c), the fully connected network finally outputs a scalar ranging from 0 to 1.

(2e) The output of the discriminator can be expressed as follows:

$$D(x_1,x_2)=D_c(D_f(x_2)-D_f(x_1));$$

(2f) Use a cross-entropy loss function as a loss function of the discriminator, use Adam algorithm as an optimization algorithm, and set a learning rate to 0.001.

Step 3: Establish a network structure of a generator.

Figure 4:
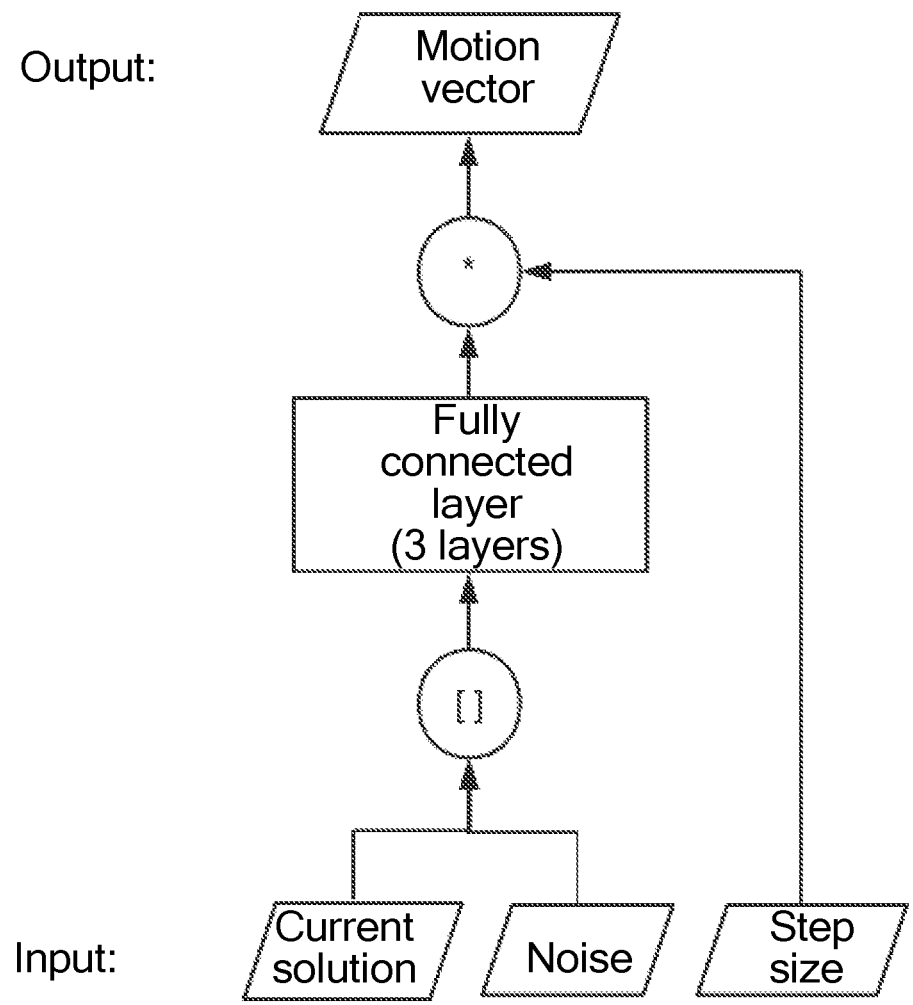
FIG. 4 is a structural diagram of a generator according to the present invention.

(3a) As shown in FIG. 4, the generator receives inputs such as a current solution (denoted as $x_{cur}$), noise (denoted as z), and a step size (denoted as L), and outputs a motion vector $G(x_{cur}, z, L)$. The motion vector is used to guide how the current solution moves to obtain a better fitness value. This vector will be added to the input current solution to generate a new solution.

(3b) Connect the input current solution $x_{cur}$ and noise z to obtain a new vector whose dimension is equal to the sum of the solution vector dimension and the noise vector dimension.

(3c) Send the vector obtained in (3b) to a 3-layer fully connected network. The dimension of an input layer of the fully connected network (denoted as $G_d$) is the sum of the solution vector dimension and the noise vector dimension, the dimension of the second layer is 64, and the dimension of an output layer is the solution vector dimension. An activation function of the second layer is an ReLU, and an activation function of the output layer is a hyperbolic tangent function (Tanh). The fully connected network receives the vector obtained in (3b), and outputs a direction vector with the same dimension as a solution vector to guide subsequent motion directions.

(3d) Calculate the dot product of the direction vector obtained in (3c) and the input step size to obtain a motion vector as a final output of the entire generator, where the motion vector represents a specific motion direction and distance.

(3e) The output of the generator can be expressed as follows:

$$G(x_{cur},z,L)=L \cdot G_d([x_{cur}^T,z^T]^T);$$

(3f) Use a cross-entropy loss function as a loss function of the generator, use Adam algorithm as an optimization algorithm, and set a learning rate to 0.001.

Step 4: As shown in FIG. 1, randomly initialize the current solution denoted as a set $S_{cur}$ through global random search, and initialize the step size.

(4a) In global random search (denoted as GS), randomly sample solutions through standard Gaussian distribution, and then use the following formula to move the solutions to a solution space:

$$GS(x_{gs})=B_l+(B_u-B_l)*x_{gs},x_{gs}\sim P_{gaussian(0,1)},$$

where $B_l$ and $B_u$ represent an upper limit and a lower limit of the domain D of the test function, and $P_{gaussian(0,1)}$ represents standard Gaussian distribution.

(4b) For current solutions $x_{cur}$ in the set $S_{cur}$, calculate corresponding fitness values $F(x_{cur})$, and sort them in ascending order of the fitness values to obtain an optimal current solution $x_{best}$ and its fitness value $F(x_{best})$.

(4c) Initialize the step size L=50, record the fitness value $L_{best\_F}=F(x_{best})$ of the optimal current solution, and set an internal counter $L_{cnt}$ for reducing the step size to 0.

Step 5: Generate a data set $T_D$ for training the discriminator, as shown in FIG. 1.

(5a) Use the generator, local random search, and global random search respectively to generate a new solution $x_{gen}$ based on the current solution $x_{cur} \in S_{cur}$ selected from a current solution set $x_{cur} \in S_{cur}$, and calculate a fitness value. Compare the generated solution with the current solution, and label it as 0 or 1 based on their fitness values as the data for training the discriminator.

(5b) Generator (denoted as GE): Use the generator to generate a motion vector based on the current solution and add it to the current solution to obtain a generative solution. This can be expressed as follows:

$$GE(x_{cur})=x_{cur}+G(x_{cur},z,L),z\sim P_{gaussian(0,1)};$$

(5c) Local random search (denoted as LS): Perform random Gaussian sampling around the current solution to obtain a generative solution. This can be expressed as follows:

$$LS(x_{cur})=x_{cur}+L*d,d\sim P_{gaussian(0,1)};$$

(5d) Global random search: Perform it as described in (4a).

(5e) Combine the solutions generated by using the three methods to obtain a new solution, and calculate its fitness value.

(5f) Pair the new solution and a current solution based on which the new solution is generated, and compare their fitness values; and if a fitness value of the new solution is less than a fitness value of the current solution, label the data pair as 1, otherwise, label it as 0.

(5g) The generated training data can be expressed as follows:

$$T_D = \{(x_{cur}, x_{gen}, 1 \text{ if } F(x_{gen}) \leq F(x_{cur}) \text{ else } 0)\},$$

where $x_{gen} \sim GS(x_{gs})$, $GE(x_{cur})$, $LS(x_{cur})$, $x_{cur} \in S_{cur}$.

Step 6: As shown in FIG. 1, use a training set $T_D$ to train the discriminator.

(6a) Sequentially take m pieces of training data $\{(x_{cur}^i, x_{gen}^i, y^i), i=1, 2, \ldots, m\}$ in batches from the training set $T_D$, and calculate a loss function:

$$loss_D = -\sum_{i=1}^{m} y^i * \log(D(x_{cur}^i, x_{gen}^i));$$

(6b) Calculate a gradient based on the loss function:

$$g_D = \frac{1}{m} \nabla_{\theta_D} loss_D,$$

where $\theta_D$ represents a network parameter of the discriminator.

(6c) Use Adam algorithm to update the network parameter of the discriminator:

$$\theta_D = \theta_D - \mu \frac{\hat{s}}{\sqrt{\hat{r}} + \delta},$$

where $\mu$ is a learning step size, which is set to 0.001 in the present invention; $\delta$ is a small constant for numerical stability, which is set to 1e-7 in the present invention; $\hat{s}$ represents correction of the first-moment deviation; and $\hat{r}$ represents correction of the second-moment deviation. The calculation formulas are as follows:

$$s = \rho_1 s + (1 - \rho_1) g_D,$$
$$r = \rho_2 r + (1 - \rho_2) g_D \odot g_D,$$
$$\hat{s} = \frac{s}{1 - \rho_1^t},$$
$$\hat{r} = \frac{r}{1 - \rho_2^t},$$

where $\rho_1$ and $\rho_2$ are exponential attenuation rates of moment estimation, which are set to 0.9 and 0.999 in the present invention; t is the number of batches, which is initialized to 0 before training, and increases by 1 upon update of each batch; and s and t are variables of the first moment and the second moment, which are initialized to 0 before training, and updated according to the foregoing formula each time.

Step 7: As shown in FIG. 1, train the generator.

(7a) Set the network parameter of the discriminator to un-trainable, and connect the discriminator to the generator, to form a network C, of which input is the input of the generator, and output is the output of the discriminator. The specific connection method is as follows:

Step 1: enter the current solution, noise, and step size into the generator and run the generator.

Step 2: add a motion vector generated by the generator to the current solution to obtain a generative solution.

Step 3: use the current solution and the generative solution obtained in step 2 as the inputs of the discriminator, and use the output of the discriminator as the output of the network C.

The output of C can be expressed as follows:

$$C(c_{cur}, z, L) = D(x_{cur}, x_{cur} + G(x_{cur}, z, L));$$

(7b) Use current solutions batch-sampled from $S_{cur}$, random Gaussian noise, and a step size as inputs of C, and run C to obtain output $C(c_{cur}, z, L)$.

(7c) Calculate a loss function of the network C:

$$loss_C = -\sum_{i=1}^{m} 1 * \log(C(x_{cur}^i, z, L)),$$

where m is a quantity of samples each time.

(7d) Calculate a gradient based on the loss function (because the network parameter of the discriminator is set to un-trainable, the network parameter of C is the network parameter of the generator):

$$g_G = \frac{1}{m} \nabla_{\theta_G} loss_C,$$

where $\theta_G$ represents the network parameter of the generator.

(7d) Update the network parameter of the generator G:

$$\theta_G = \theta_G - \mu \frac{\hat{s}}{\sqrt{\hat{r}} + \delta},$$

The settings and calculation methods of $\mu$, $\delta$, $\hat{s}$, and $\hat{r}$ are described in (6c).

Step 8: As shown in FIG. 1, select and retain current solutions.

(8a) Combine a current solution set and a generative solution set to form a candidate solution set $S_{candidate}$.

(8b) For each solution in the candidate solution set, calculate its retention probability based on the order of its fitness value in all candidate solutions:

$$P_{retain}(x) = \frac{r_{F(x)}^{-\alpha}}{\sum_{i=1}^{\|S_{candidate}\|} r_{F(x_i)}^{-\alpha}},$$

where $r_{F(x)}$ represents the order of a fitness value of solution x in all candidate solutions arranged in ascending order; $\|S_{candidate}\|$ represents a size of the candidate solution set; and $\alpha$ is a parameter that controls the probability distribution, where a larger value of $\alpha$ indicates a higher retention probability of a solution with a small fitness value and a lower retention probability of a solution with a large fitness value; and α is set to 3 in the present invention.

(8c) Select a solution based on the retention probability of each solution, retain the selected solution, and update $S_{cur}$.

Step 9: As shown in FIG. 1, reduce the step size L.

(9a) Check whether a difference between a fitness value of an optimal solution x* in the current $S_{cur}$ and $L_{best\_F}$ is less than a sufficiently small constant:

$$|F(x^*) - L_{best_F}| \le \varepsilon,$$

where ε is a sufficiently small constant, which is set to 1e-8 in the present invention. If so, perform (9b); otherwise, set $L_{cnt}$ to 0 and perform (9c).

(9b) Increase $L_{cnt}$ by 1, check whether $L_{cnt}$ is greater than a specified threshold T, and if so, multiply the step size L by an attenuation factor γ:

$$L = L * \gamma, \text{ if } L_{cnt} > T,$$

In the present invention, the threshold T is set to 50, and the attenuation coefficient γ is set to 0.6. If not so, perform step (9c).

(9c) Update $L_{best\_F}$ to the fitness value F(x*) of the optimal solution x* in the current $S_{cur}$.

Step 10: As shown in FIG. 1, determine whether the number of current iterations reaches the maximum number of iterations, and if so, output the optimal current solution; otherwise, go back to step (5).

In the present invention, a simple logistics distribution simulation experiment is designed, with the following parameter settings:

$$N = 3, M = 2,$$

$$T = \begin{bmatrix} 0 & 1 & 10 \\ 1 & 0 & 10 \\ 10 & 10 & 0 \end{bmatrix}.$$

Through the foregoing steps, an optimal solution x=[1, 2, 0, 3, 0, 0] is obtained, corresponding to the following optimization scheme: delivery person 1 delivers goods to locations 1 and 2, and delivery person 2 delivers goods to location 3. This is the optimal delivery scheme.

In specific implementation, a CEC2013 real function test set is selected as a test function set to further verify the method in the present invention. The test function set contains 28 real functions, of which the first 5 functions are single-mode functions and the last 23 functions are multi-mode functions. The domain is defined as having a value between −100 and 100 on any dimension. The test dimension is set to 30, and the noise dimension is set to 10. An absolute difference between an algorithm optimal solution and an actual optimal solution is used as an evaluation criterion. The test platform used in the present invention uses NVIDIA GeForce GTX TITAN X and runs on Ubuntu 14.04.5 LTS, with Python 3.5 and Tensorflow 1.3.0.

Specific test parameter settings are as described above. Four other algorithms, including artificial bee colony (ABC), particle swarm optimization (SPSO), differential evolution (DE), and guided fireworks algorithm (GFWA), are selected for comparison. The average value results of 51 validations on the CEC2013 real function test set are shown in Table 1.

TABLE 1

Average optimization results and average ranking of the present invention and the four selected methods

| CEC2013 | GAN-O | ABC | SPSO | DE | GFW A |
|---|---|---|---|---|---|
| 1 | 0.00E+00 | 0.00E+00 | 0.00E+00 | 1.89E−03 | 0.00E+00 |
| 2 | 4.36E+05 | 6.20E+06 | 3.38E+05 | 5.52E+04 | 6.96E+05 |
| 3 | 3.68E+07 | 5.74E+08 | 2.88E+08 | 2.16E+06 | 3.74E+07 |
| 4 | 1.40E+04 | 8.75E+04 | 3.86E+04 | 1.32E−01 | 5.00E−05 |
| 5 | 9.43E−04 | 0.00E+00 | 5.42E−04 | 2.48E−03 | 1.55E−03 |
| Average ranking (single-mode) | 2.4 | 3.4 | 2.6 | 2.8 | 2.6 |
| 6 | 1.89E+01 | 1.46E+01 | 3.79E+01 | 7.82E+00 | 3.49E+01 |
| 7 | 4.10E+01 | 1.25E+02 | 8.79E+01 | 4.89E+01 | 7.58E+01 |
| 8 | 2.09E+01 | 2.09E+01 | 2.09E+01 | 2.09E+01 | 2.09E+01 |
| 9 | 1.56E+01 | 3.01E+01 | 2.88E+01 | 1.59E+01 | 1.83E+01 |
| 10 | 2.23E−02 | 2.27E−01 | 3.40E−01 | 3.24E−02 | 6.08E−02 |
| 11 | 8.66E+01 | 0.00E+00 | 1.05E+02 | 7.88E+01 | 7.50E+01 |
| 12 | 7.76E+01 | 3.19E+02 | 1.04E+02 | 8.14E+01 | 9.41E+01 |
| 13 | 1.63E+02 | 3.29E+02 | 1.94E+02 | 1.61E+02 | 1.61E+02 |
| 14 | 3.27E+03 | 3.58E−01 | 3.99E+03 | 2.38E+03 | 3.49E+03 |
| 15 | 3.04E+03 | 3.88E+03 | 3.81E+03 | 5.19E+03 | 3.67E+03 |
| 16 | 1.31E−01 | 1.07E+00 | 1.31E+00 | 1.97E+00 | 1.00E−01 |
| 17 | 1.24E+02 | 3.04E+01 | 1.16E+02 | 9.29E+01 | 8.49E+01 |
| 18 | 1.22E+02 | 3.04E+02 | 1.21E+02 | 2.34E+02 | 8.60E+01 |
| 19 | 4.53E+00 | 2.62E−01 | 9.51E+00 | 4.51E+00 | 5.08E+00 |
| 20 | 1.32E+01 | 1.44E+01 | 1.35E+01 | 1.43E+01 | 1.31E+01 |
| 21 | 2.76E+02 | 1.65E+02 | 3.09E+02 | 3.20E+02 | 2.59E+02 |
| 22 | 3.84E+03 | 2.41E+01 | 4.30E+03 | 1.72E+03 | 4.27E+03 |
| 23 | 3.67E+03 | 4.95E+03 | 4.83E+03 | 5.28E+03 | 4.32E+03 |
| 24 | 2.53E+02 | 2.90E+02 | 2.67E+02 | 2.47E+02 | 2.56E+02 |
| 25 | 2.75E+02 | 3.06E+02 | 2.99E+02 | 2.80E+02 | 2.89E+02 |
| 26 | 2.00E+02 | 2.01E+02 | 2.86E+02 | 2.52E+02 | 2.05E+02 |
| 27 | 7.85E+02 | 4.16E+02 | 1.00E+02 | 7.64E+02 | 8.15E+02 |
| 28 | 3.41E+02 | 2.58E+02 | 4.01E+02 | 4.02E+02 | 3.60E+02 |
| Average ranking (multi-mode) | 2.17 | 2.96 | 4.00 | 2.83 | 2.57 |
| Average ranking (all) | 2.21 | 3.04 | 3.75 | 2.82 | 2.57 |

Test results show that the present invention achieves better results than the other four algorithms, which demonstrates the validity of the method proposed by the present invention.

It should be noted that the embodiment is intended to help further understand the present invention, but those skilled in the art can understand that various replacements and modifications may be made without departing from the spirit and scope of the present invention and the claims. Therefore, the present invention is not limited to the content disclosed in the embodiment, and the protection scope of the present invention shall be subject to the protection scope of the claims.

What is claimed is:

1. A generative adversarial network-based optimization (GAN-O) method, comprising:
   - (A1) transforming an application into a function optimization problem;
   - (A2) establishing a GAN-based function optimization model according to a test function and a test dimension of the function optimization problem, comprising constructing a generator G and a discriminator D based on the GAN, wherein
   - inputs of the discriminator D are two vectors whose sizes are the same as the test dimension; and an output is a scalar whose value is 1 or 0, indicating whether a latter vector is better than a former vector;
   - an input of the generator is a vector whose size is the test dimension plus a noise dimension; and an output is a vector indicating a guiding direction, whose size is equal to the test dimension; and
   - training the function optimization model by training the discriminator and the generator, to obtain a trained function optimization model;
   - (A3) using the trained function optimization model for iterative calculation;
   - (A31) before iteration, randomly initializing a current solution;
   - (A32) performing the following operations during each iteration:
   - (A321) sampling a motion vector from the generator, calculating a generative solution, performing estimation by using a fitness value function, calculating a loss function of the discriminator, and updating network parameters of the discriminator;
   - (A322) determining the network parameters of the discriminator, connecting the discriminator to the generator, calculating a loss function of the generator, and updating network parameters of the generator accordingly;
   - (A323) using the generator to generate a new solution and combine it with the current solution to obtain all candidate solutions;
   - (A324) calculating fitness values of all the candidate solutions, and assigning retention probabilities based on the fitness values;
   - (A325) selecting, based on the retention probabilities, solutions with a same quantity as the current solutions from the candidate solutions as new current solutions; and
   - (A326) stopping iteration when a maximum number of iterations is reached, wherein the solutions retained in this case are optimal solutions;
   - through the foregoing steps, optimal solutions are obtained based on the GAN.

2. The GAN-O method according to claim 1, wherein step (A1) of transforming an application into a function optimization problem specifically comprises: determining the test function, namely a function representing the function optimization problem of the application; determining the test dimension; and setting the noise dimension;
   - (1a) determining a to-be-optimized test function, comprising a function expression, a domain denoted as D, and a function input dimension denoted as $\|x\|$, wherein after an independent variable x meeting requirements is input, the test function outputs a fitness value F(x) of the independent variable;
   - (1b) setting a test dimension $\|x\|$, namely the function input dimension; and
   - (1c) setting a noise dimension $\|z\|$ that controls the size of a noise vector and is connected to an input solution as an input when the generative network generates the solution.

3. The GAN-O method according to claim 1, wherein the application in step (A1) comprises but is not limited to logistics distribution, machine learning or deep learning.

4. The GAN-O method according to claim 1, wherein for the logistics distribution problem, step (A1) aims to optimize the logistics speed or efficiency by using the existing facilities, so that the total logistics speed is the highest or the total distribution time is the shortest; and specifically,
   - there are a total of M delivery persons in one distribution station, the delivery speed of each delivery person is the same, N locations are covered by the distribution station, and distances between every two distribution locations form matrix T, wherein T(i,j) represents the time for a delivery person to go from location i to location j; and transforming the logistics distribution problem into a discrete function optimization problem specifically comprises the following operations:
   - S1: designing a coding scheme for solutions to form a code $x_i \in \|N\|$, i=1,2, . . . , M of a solution, which specifically comprises:
   - (S1a) sorting locations assigned to delivery persons to form a digital code string denoted as $x_i \in \|N\|$, i=1,2, . . . , M, wherein $x_i$ represents a location assigned to the i-th delivery person; M is a total quantity of delivery persons; the maximum dimension of $x_i$ is $\|N\|$; and if a quantity of locations assigned to a delivery person is less than N, zero is filled to an unassigned location, indicating that no delivery is required;
   - (S1b) connecting codes of M delivery persons to form a complete solution: $x=[x_1, x_2, \ldots, x_M]$;
   - S2: determining a solution space, namely the domain, wherein:
   - (S2a) the dimension of the solution is equal to the sum of delivery codes of each delivery person, that is, $\|x\|=N*M$;
   - (S2b) a value of $x_i$ ranges from 0 to N, wherein 0 represents that no delivery is required; a number ranging from 1 to N indicates delivery to a location represented by the number, and the number can appear only once in all dimensions of this solution; and the dimension of the solution is expressed as follows:

$$x_i \in Z^+, 0 \leq x_i \leq N, \text{ for } i = 1, 2, \ldots, N*M,$$

$$\left( \sum_{i=i}^{N*M} (1 \text{ if } x_i == k \text{ else } 0) = 1, \forall k \in Z^+, 1 \leq k \leq N. \right.$$

wherein $Z^+$ represents a set of positive integers, N is a quantity of locations, and M is a quantity of delivery persons;

S3: determining an objective function, namely the test function, wherein

M delivery persons deliver goods at the same time, and the total delivery time is the time spent by a delivery person who completes the delivery last, that is, an objective function is expressed as follows:

$$T(x) = \max_{i=0}^{N-1}\left(\sum_{j=1}^{N-1} t(x_{i*N+j}, x_{i*N+j+1})\right)$$

wherein $$t(k, l) = \begin{cases} T(k, l), & \text{if } k \geq 1 \text{ and } l \geq 1 \\ 0, & \text{else} \end{cases}$$

k, l are $x_{i+N+j}$, $x_{i+N+j+1}$.

5. The GAN-O method according to claim 1, wherein step (A2) of establishing a network structure and a loss function of the discriminator, and receiving, by the discriminator D, two input solutions $x_1$ and $x_2$, and outputting D ($x_1$, $x_2$), wherein the output presents comparison between fitness values of $x_2$ and $x_1$, specifically comprises the following operations:

(2a) for the two input solutions $x_1$ and $x_2$, using a 4-layer fully connected network to extract features, wherein the dimension of an input layer of $D_f$ is the dimension of the solution, namely the test dimension; the dimension of the second layer is 64, the dimension of the third layer is 64, and the dimension of the fourth layer is 10; and an activation function of each layer is a rectified linear unit (ReLU), that is, $x_1$ and $x_2$ are received through $D_f$, two 10-dimensional vectors are extracted as features of $x_1$ and $x_2$;

(2b) performing subtraction between the two extracted vectors;

(2c) sending a vector obtained after the subtraction to a 3-layer fully connected network $D_c$, wherein the dimension of an input layer of $D_c$ is 10, the dimension of the second layer is 10, and the dimension of the third layer is 1; an activation function of the second layer is an ReLU, and an activation function of an output layer is Sigmoid; and finally a scalar ranging from 0 to 1 is output through $D_c$;

(2d) expressing the output of the discriminator as follows:

$$D(x_1, x_2) = D_c(D_f(x_2) - D_f(x_1));$$

(2e) using a cross-entropy loss function as the loss function of the discriminator, and using Adam algorithm as an optimization algorithm.

6. The GAN-O method according to claim 1, wherein step (A2) of establishing a network structure and a loss function of the generator, wherein the generator G receives inputs, comprising a current solution $x_{cur}$, noise z, and a step size L, and outputs a motion vector $G(x_{cur}, z, L)$, specifically comprises the following operations:

(3a) connecting the input current solution $x_{cur}$ and the noise z to obtain a vector whose dimension is equal to the sum of the test dimension and the noise dimension;

(3b) sending the vector to a 3-layer fully connected network $G_d$, and outputting a direction vector with the same dimension as a solution vector to guide subsequent motion directions;

wherein the dimension of an input layer of $G_d$ is equal to the sum of the dimension of the solution vector and the dimension of a noise vector, the dimension of the second layer is 64, and the dimension of an output layer is equal to the dimension of the solution vector; an activation function of the second layer is an ReLU, and an activation function of the output layer is a hyperbolic tangent function (Tanh);

(3c) calculating the dot product of the direction vector obtained in (3b) and the input step size, to obtain a motion vector as the final output of the entire generator, wherein the motion vector represents a specific motion direction and distance, and is used to guide how the current solution moves to obtain a better fitness value;

(3d) expressing the output of the generator as follows:

$$G(x_{cur}, z, L) = L \cdot G_d([x_{cur}^T, T, Z^T]^T);$$

(3e) using a cross-entropy loss function as the loss function of the generator, and using Adam algorithm as an optimization algorithm.

7. The GAN-O method according to claim 1, wherein step (A31) of randomly initializing a current solution $S_{cur}$ through global random search, and initializing a step size L specifically comprises the following operations:

(4a) in global random search GS, randomly sampling solutions through standard Gaussian distribution, and then using formula 1 to move the solutions to a solution space:

$$GS(x_{gs}) = B_l + (B_u - B_l) * x_{gs}, \quad x_{gs} \sim P_{gaussian(0,1)} \quad \text{Formula 1}$$

wherein $x_{gs} \sim P_{gaussian(0,1)}$ represents that $x_{gs}$ is randomly sampled through standard Gaussian distribution; and $B_l$ and $B_u$ represent an upper limit and a lower limit of the domain D of the test function;

(4b) for current solutions $x_{cur}$ in the set $S_{cur}$, using the test function to calculate corresponding fitness values $F(x_{cur})$, and sorting them in ascending order of the fitness values to obtain an optimal current solution $x_{best}$ and its fitness value $F(x_{best})$; and (4c) initializing the step size L to 50, setting a currently optimal fitness value $L_{best_F}$ recorded in a step controller to $F(x_{best})$, and setting a counter $L_{cnt}$ of the step controller to 0.

8. The GAN-O method according to claim 1, wherein the training the function optimization model and using a trained model for iterative calculation specifically comprises the following operations:

(5) generating a data set $T_D$ for training the discriminator:

(5a) using the generator (GE), local random search (LS), and global random search (GS) respectively to generate a new solution $x_{gen}$ based on the current solution $x_{cur}$ selected from a current solution set $S_{cur}$, and calculating a fitness value of $x_{gen}$;

comparing the generated new solution $x_{gen}$ with the current solution $x_{cur}$ based on which the new solution is generated, and labeling it based on fitness values (labeling it as 1 when a fitness value of $x_{gen}$ is greater than that of $x_{cur}$; otherwise, labeling it as 0) as the data for training the discriminator;

(5b) combining the solutions generated by using the three methods to generate a new solution, and calculating its fitness value;

(5c) combining the new solution obtained in (5b) and the current solution based on which the new solution is generated into a data pair, and comparing their fitness values; and if a fitness value of the new solution is less than a fitness value of the current solution, labeling the data pair as 1, otherwise, labeling it as 0;

(5d) generating the training data set $T_D$, which is expressed as follows:

$$T_D = \{(x_{cur}, x_{gen}, 1 \text{ if } F(x_{gen}) \leq F(x_{cur}) \text{ else } 0)\} \quad \text{Formula 4}$$

wherein $x_{gen} \sim GS(x_{gs})$, $GE(x_{cur})$, $LS(x_{cur})$, $x_{cur} \in S_{cur}$;

(6) using the training set $T_D$ to train the discriminator:

(6a) sequentially taking m pieces of training data $\{(x_{cur}^i, x_{gen}^i, y^i), i=1,2,\ldots, m\}$ in batches from the training set $T_D$, and calculating a loss function according to formula 5:

$$loss_D = -\Sigma_{i=1}^m y^{i*} \log_2(D(x_{cur}^i, x_{gen}^i)) \quad \text{Formula 5}$$

wherein D represents the discriminator, and $D(x_{cur}^i, x_{gen}^i)$ represents an output of the discriminator when inputs are $x_{cur}^i$ and $x_{gen}^i$;

(6b) calculating a gradient $g_D$, based on the loss function according to formula 6:

$$g_D = \frac{1}{m} \nabla_{\theta_D} loss_D \quad \text{Formula 6}$$

wherein $\theta_D$ represents a network parameter of the discriminator;

(6c) updating the network parameter of the discriminator by using Adam algorithm:

$$\theta_D = \theta_D - \mu \frac{\hat{s}}{\sqrt{\hat{r}} + \delta} \quad \text{Formula 7}$$

wherein $\mu$ is a learning step size, which is set to 0.001 in the present invention; $\delta$ is a small constant for numerical stability; $\hat{s}$ represents correction of the first-moment deviation; and $\hat{r}$ represents correction of the second-moment deviation;

(7) training the generator by performing the following operations:

(7a) setting the network parameter of the discriminator to un-trainable, and connecting the discriminator to the generator to obtain a network C, of which input is the input of the generator, and output is the output of the discriminator, wherein the specific connection method is as follows:

step 1: entering the current solution, noise, and step size into the generator and running the generator;

step 2: adding a motion vector generated by the generator to the current solution to obtain a generative solution;

step 3: using the current solution and the generative solution obtained in step 2 as the inputs of the discriminator, and using the output of the discriminator as the output of the network C, as shown in formula 8:

$$C(c_{cur}, z, L) = D(x_{cur}, x_{cur} + G(x_{cur}, z, L)) \quad \text{Formula 8}$$

(7b) using current solutions batch-sampled from $S_{cur}$, random Gaussian noise, and a step size as inputs of C, and running C to obtain output $C(c_{cur}, z, L)$;

(7c) calculating a loss function of the network C according to formula 9:

$$loss_c = -\Sigma_{i=1}^m 1^* \log(C(x_{cur}^i, z, L)) \quad \text{Formula 9}$$

wherein m is a quantity of samples each time;

(7d) calculating a gradient $g_G$ based on the loss function according to formula 10, wherein a network parameter of C is the network parameter of the generator:

$$g_G = \frac{1}{m} \nabla_{\theta_G} loss_C \quad \text{Formula 10}$$

wherein $\theta_G$ represents the network parameter of the generator;

(7e) updating the network parameter of the generator G according to formula 11:

$$\theta_G = \theta_G - \mu \frac{\hat{s}}{\sqrt{\hat{r}} + \delta} \quad \text{Formula 11}$$

(8) selecting and retaining current solutions by performing the following steps:

(8a) combining a current solution set and a generative solution set to form a candidate solution set $S_{candidate}$;

(8b) for each solution in the candidate solution set, calculating its retention probability based on the order of its fitness value in all candidate solutions, as shown in formula 11:

$$P_{retain}(x) = \frac{r_{F(x)}^{-\alpha}}{\sum_{i=1}^{\|S_{candidate}\|} r_{F(x_i)}^{-\alpha}} \quad \text{Formula 11}$$

wherein $P_{retain}(x)$ represents a retention probability of solution x; $r_{F(x)}$ represents the order of a fitness value of solution x in all candidate solutions arranged in ascending order; $\|S_{candidate}\|$ represents a size of the candidate solution set; and $\alpha$ is a parameter that controls the probability distribution;

(8c) selecting a solution based on the retention probability of each solution, retaining the selected solution, and updating $S_{cur}$;

(9) reducing a step size L by performing the following steps:

(9a) checking whether a difference between a fitness value of an optimal solution $x^*$ in the current $S_{cur}$ and $L_{best\_F}$ is less than a sufficiently small constant:

$$|F(x^*) - L_{best_F}| \leq \varepsilon,$$

wherein $\varepsilon$ is a sufficiently small constant;

if so, performing (9b); otherwise, setting $L_{cnt}$ to 0 and performing (9c);

(9b) increasing $L_{cnt}$ by 1, checking whether $L_{cnt}$ is greater than a specified threshold T, and if so, multiplying the step size L by an attenuation factor $\gamma$;

(9c) updating $L_{best\_F}$ to the fitness value $F(x^*)$ of the optimal solution $x^*$ in the current $S_{cur}$; and

(10) determining whether the number of current iterations reaches the maximum number of iterations, and if so, outputting the current optimal solution; otherwise, going back to step (5).

9. The GAN-O method according to claim 8, wherein step (5a) of using the generator G to generate a solution comprises: using the generator to generate a motion vector based on the current solution $x_{cur}$, and adding it to the current solution to obtain a generative solution; and the specific steps are as follows:
- step 1: performing random sampling through standard Gaussian distribution to obtain a noise vector;
- step 2: inputting the current solution, the noise vector obtained in step 1, and a step size into the generator, and running the generator to generate the motion vector;
- step 3: adding the motion vector obtained in step 2 to the current solution to obtain the generative solution, as shown in Formula 2:

$$GE(x_{cur})=x_{cur}+G(x_{cur}, z, L), z \sim P_{gaussian(0,1)} \qquad \text{Formula 2}$$

wherein z represents the noise vector; and L represents the step size.

10. The GAN-O method according to claim 8, wherein step (5a) of using local random search to obtain a generative solution comprises: performing random Gaussian sampling around the current solution $x_{cur}$ to obtain the generative solution; and the specific steps are as follows:
- step 1: performing random sampling through standard Gaussian distribution to obtain a direction vector;
- step 2: multiplying the direction vector obtained in step 1 by the step size to obtain a motion vector; and
- step 3: adding the motion vector obtained in step 2 to the current solution to obtain the generative solution, as shown in formula 3:

$$LS(x_{cur})=x_{cur}+L*d, d \sim P_{gaussian(0,1)} \qquad \text{Formula 3}$$

wherein d represents the direction vector; and L represents the step size.

* * * * *